106. COMPOSITIONS, COATING OR PLASTIC.

82  Patented Feb. 5, 1935

1,989,833

UNITED STATES PATENT OFFICE 1,989,833

ADHESIVE

Willis C. Ware, Chicago, Ill., assignor of one-half to Edward B. Sickle, Chicago, Ill.

No Drawing. Application July 16, 1931,
Serial No. 551,307

11 Claims. (Cl. 87—17)

The invention relates generally to adhesives. More particularly the invention relates to that type of adhesive which includes liquid silicate of soda and is designed to secure in place against ceilings, walls or other surfaces, composition slabs, sound absorbing blocks, cement tiles and like structural elements.

One object of the invention is to provide an adhesive of this type which includes as ingredients, a chemically inert stiffener and a chemically inert filler, and is rendered permanently plastic and of the proper elasticity for the use to which it is put, by the use of a low ratio solution of silicate of soda.

Another object of the invention is to provide an adhesive of the last mentioned type in which the stiffener is formed of asbestos fiber or a like material and gives body and tensile strength to the low ratio silicate of soda solution, and the filler is formed of asbestine and serves to render the adhesive workable.

A further object of the invention is to provide a permanently plastic adhesive of the character under consideration which includes a surface tension reducer such as sulphonated oil, so that it is of maximum strength and works readily into the interstices of the structural elements to which it is applied and the walls or surfaces against which the elements are placed.

A further object of the invention is to provide a chemically inert, permanently plastic adhesive which is generally an improvement upon previously devised adhesives for the same purpose, is exceedingly efficient in operation in that it serves to effect an immediate bond for the elements with which it is used and is of such consistency that it may be used to build out the structural elements from the walls or surfaces to which they are bonded.

The adhesive which forms the subject matter of the invention consists of a base of liquid silicate of soda, a chemically inert stiffener, a chemically inert filler and a surface tension reducer, and is formed by mixing the various ingredients in any suitable mechanical mixing device. The base is made of a low ratio silicate of soda solution so that the adhesive remains permanently plastic and retains its initial jell structure and elasticity at all times. In practice it has been found that a silicate soda solution of approximately 60° Baumé and consisting of one part sodium oxide ($Na_2O$) and two parts silica ($SiO_2$) gives the best results and insures permanent plasticity. Asbestos fiber, sawdust, wood or hair fiber or slag wool is used as the stiffener and tends to give the adhesive the proper or necessary body and to prevent running, flowing or sagging. In addition, the stiffener tends to give the adhesive sufficient tensile strength so that it will be adapted for the purpose for which it is designed. In making the adhesive, the low ratio silicate of soda solution is introduced into the mixer and then the asbestos fiber or other material which serves as the stiffener is added. The filler is preferably in the form of asbestine or powdered silica. It is added to the silicate of soda solution after the asbestos fiber and tends to thicken the adhesive and render it workable. Sulphonated oil, such, for example, as castor oil treated with sulphuric acid, is used as the surface tension reducer and serves to give gripping strength to the adhesive.

In making a fifty-five gallon batch of the adhesive, the base, stiffener, filler and surface tension reducer are used in the following proportions:

36 gallons base (low ratio silicate of soda solution);
160 pounds of stiffener (asbestos fiber);
128 pounds of filler (asbestine); and
.36 gallon surface tension reducer (sulphonated oil).

One gallon of adhesive weighs approximately fourteen pounds. The adhesive is of extremely heavy consistency and serves efficiently and effectively to hold in place against ceilings, walls or other surfaces, composition slabs, sound absorbing blocks, cement tiles and like structural elements. It is water proof, requires no setting period and is chemically inert. By virtue of the fact that the solution of silicate of soda is of low ratio and because the various ingredients are incombustible, the adhesive remains plastic at all times and is fireproof.

The adhesive is used by applying it in large quantities to the back marginal portions of the structural elements. After application of the adhesive to the structural elements, the latter are placed against the wall or surface to which they are to be bonded, and are then pressed towards the wall or surface and slid into place, so as to spread the adhesive and unite the latter with the wall or surface and the contiguous face portions of the structural elements. By virtue of the fact that the adhesive requires no setting period and is in the nature of a permanently plastic mass, an immediate bond is effected for the structural elements and it is not necessary to nail or shore the latter temporarily in place. Since the adhesive is extremely heavy as far as consistency or body is concerned, it is possible, in applying structural elements to a wall or surface by means of the adhesive, to use the adhesive as a filler and thus space the elements any desired distance from the wall or surface. The adhesive has special utility when used in connection with sound absorbing blocks or composition slabs in that it is resilient by virtue of the fact that it is permanently plastic and hence augments or tends to increase the sound absorbing property of the blocks. In connection with breakable panels of glass or similar material, the adhesive has special utility in that it absorbs shocks or vibrations and thereby prevents breakage. In view of the fact that the adhesive is plastic at all times, it is possible to remove at any time structural elements bonded together or to a wall by the adhesive and to put such elements back in place without the use of additional adhesive. The surface tension reducer in the adhesive causes the adhesive to work readily into the interstices of the structural elements and the wall or surfaces against which the structural elements are placed.

The herein disclosed adhesive may be manufactured at a comparatively low cost and serves effectively and efficiently to hold structural elements in place. It may be applied to practically any wall or like surface without special preparation of such wall or surface and will not discolor the structural element with which it is used inasmuch as it is chemically inert.

Whereas the adhesive has been described in batches of fifty gallons as consisting of 36 gallons of base, 160 pounds of stiffener, 128 pounds of filler and .36 gallon surface tension reducer, it is to be understood that the ingredients may be used in different proportions.

Having thus described the invention, what I claim as new and desire to secure by Letters Patent, is:

1. A permanently plastic, fireproof adhesive formed of a solution of silicate of soda containing no more than two parts silica to one part sodium oxide, and an admixture of material chemically inert with respect to the solution and serving to give body and tensile strength to the adhesive.

2. A permanently plastic, fireproof adhesive formed of a solution of silicate of soda containing no more than two parts silica to one part sodium oxide, and an admixture of less than an equal amount by weight of fibrous material chemically inert with respect to the solution and serving to give body and tensile strength to the adhesive.

3. A permanently plastic, chemically inert, fireproof adhesive formed of a solution of silicate of soda containing no more than two parts silica to one part sodium oxide, and an admixture of asbestos fiber serving to give body and tensile strength to the adhesive.

4. A permanently plastic, chemically inert, fireproof adhesive formed of a solution of silicate of soda containing no more than two parts silica to one part sodium oxide, and an admixture of less than an equal amount by weight of asbestos fiber and asbestine serving to give body and tensile strength to the adhesive.

5. A permanently plastic, chemically inert, fireproof adhesive formed of a solution of silicate of soda containing no more than two parts silica to one part sodium oxide, and an admixture of material selected from the group consisting of asbestos fiber, sawdust, wood fiber, slag wool and hair fiber and serving to give body and tensile strength to the adhesive.

6. A permanently plastic, fireproof adhesive consisting of a solution of silicate of soda containing no more than two parts silica to one part sodium oxide, an admixture of fibrous material chemically inert with respect to the solution and serving to give body and tensile strength to the adhesive, and a surface tension reducer.

7. A permanently plastic, chemically inert, fireproof adhesive consisting of a solution of silicate of soda containing no more than two parts silica to one part sodium oxide, an admixture of asbestos fiber and asbestine serving to give body and strength to the adhesive, and a surface tension reducer.

8. A permanently plastic, chemically inert, fireproof adhesive consisting of a solution of silicate of soda containing no more than two parts silica to one part sodium oxide, an admixture of less than an equal amount by weight of asbestos fiber and asbestine serving to give body and tensile strength to the adhesive, and a surface tension reducer of sulphonated oil.

9. A permanently plastic, fireproof adhesive formed of a solution of silicate of soda containing no more than two parts silica to one part sodium oxide and of approximately 60° Baumé and an admixture of less than an equal amount by weight of fibrous material chemically inert with respect to the solution and serving to give body and tensile strength to the adhesive.

10. A permanently plastic, fireproof adhesive formed of a solution of silicate of soda containing no more than two parts silica to one part sodium oxide, and an admixture of approximately one-third the amount by weight of fibrous material chemically inert with respect to the solution and serving to give body and tensile strength to the adhesive.

11. A permanently plastic, chemically inert, fireproof adhesive consisting of a solution of silicate of soda containing no more than two parts silica to one part sodium oxide and approximately 60° Baumé, an admixture of asbestos fiber and asbestine, and a surface tension reducer in substantially the proportions specified.

WILLIS C. WARE.